Sept. 18, 1928.  1,685,010
J. E. THORNTON
SPOOL CASE FOR CAMERAS AND FOR CINEMATOGRAPH AND
SIMILAR PROJECTION APPARATUS
Filed Feb. 1, 1927  2 Sheets-Sheet 1
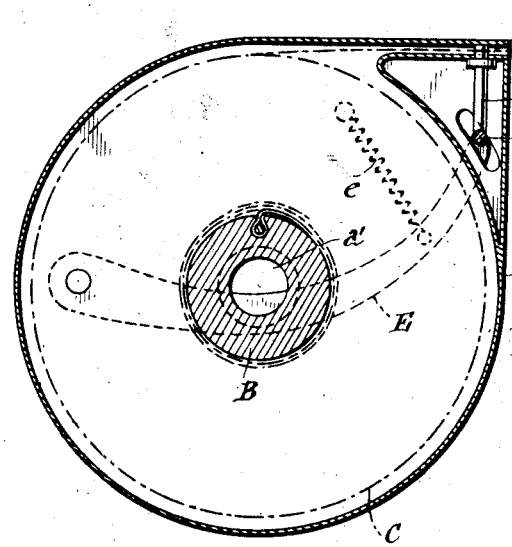
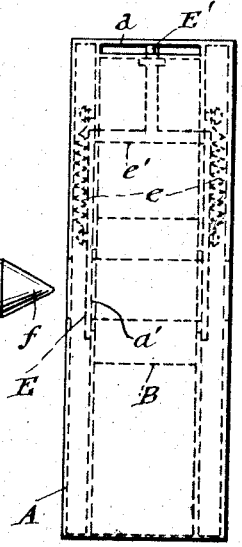
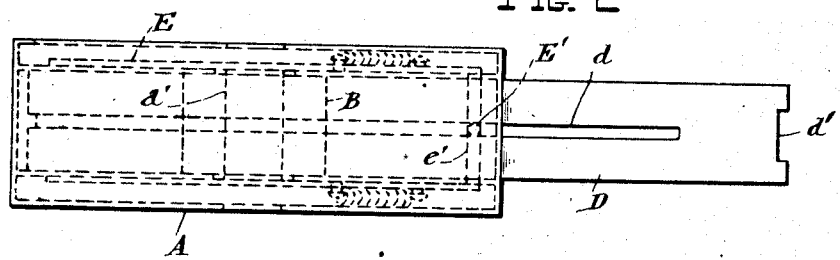
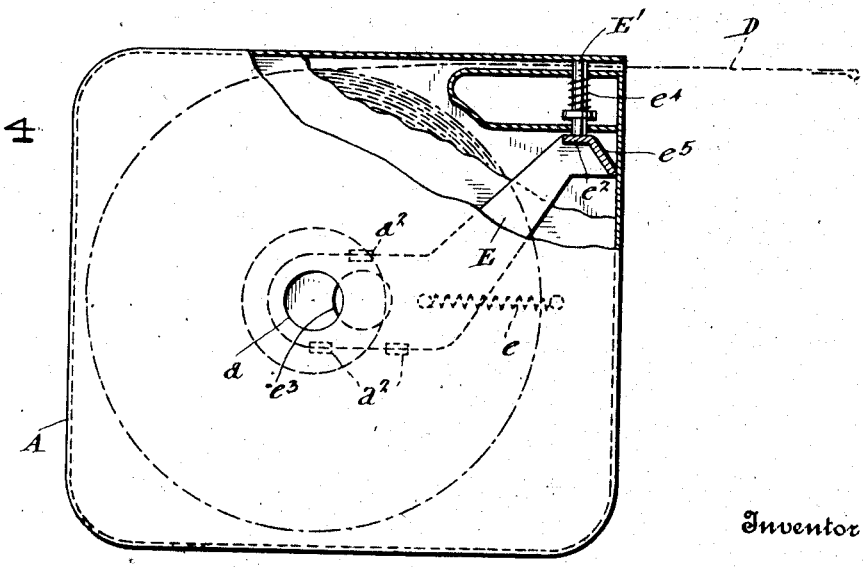
Inventor
John Edward Thornton,
By
Attorney Sept. 18, 1928. 1,685,010
J. E. THORNTON
SPOOL CASE FOR CAMERAS AND FOR CINEMATOGRAPH AND
SIMILAR PROJECTION APPARATUS
Filed Feb. 1, 1927 2 Sheets-Sheet 2

Inventor
John Edward Thornton,
By
Attorney

Patented Sept. 18, 1928.

1,685,010

UNITED STATES PATENT OFFICE.

JOHN EDWARD THORNTON, OF WEST HAMPSTEAD, LONDON, ENGLAND.

SPOOL CASE FOR CAMERAS AND FOR CINEMATOGRAPH AND SIMILAR PROJECTION APPARATUS.

Application filed February 1, 1927, Serial No. 165,231, and in Great Britain December 11, 1925.

This invention relates to spool-cases for containing continuous film ribbons for use in projectors for exhibiting cinematograph (motion) pictures or stationary (series) pictures or for use in cameras for obtaining such pictures.

The object of the invention is to provide a spool case or film-container in which the film contents are locked in the container or case by mechanism or a device which is only released by the insertion of the spool-case or container in the projector or camera. The film is preferably provided with a blank leader-strip which is not prevented by the locking mechanism or device from being pulled out of the spool-case or container before the latter is inserted in the projector or camera, so that there is a protruding length of such leader-strip which can be freely manipulated in any desired manner, such as by threading it into or through the "gate" or analogous mechanism and attaching its free end to a winding reel or to a blank leader-strip attached to such reel.

The invention will be described with reference to the accompanying drawings in which several forms of the invention are illustrated. In these drawings:—

Fig. 1 is a sectional elevation of one form of the invention.

Fig. 2 is a plan of same.

Fig. 3 is a front view of same.

Fig. 4 is a side view, partly in section, of another form of the invention.

Figure 5:
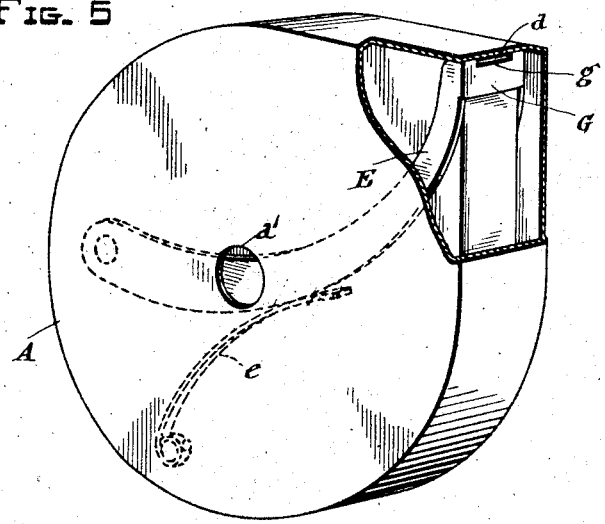
Fig. 5 is a perspective view of another form of the invention.

The spool-case shown in Figs. 1, 2 and 3 comprises a cylindrical box or case A of metal having a tangential slot or passage $a$ through which the film can be withdrawn. A film winding core or bobbin B of any suitable construction is mounted within the case A. The core or bobbin B is hollow for the passage of a spindle and the two sides of the case A are provided with corresponding apertures $a^1$ for the same purpose.

One end of the film C is attached to the core or bobbin B in any suitable way. A blank fireproof leader-strip is preferably arranged between the end of the film and the core or reel B. A second blank leader-strip D, preferably of fireproof material, is affixed to the other end of the film and this leader-strip D has a central slot $d$ running longitudinally for a considerable portion of its length.

A curved arm or lever E is pivoted at each side of the case A and each arm or lever E is held in its normal position by a spring $e$, the position of each lever being such that it partly covers an aperture $a^1$ in the case A for the passage of the spindle. The two levers E are connected together at their free ends by a bar $e^1$ which carries an upwardly extending bolt $E^1$ which passes transversely through the tangential slot or passage $a$ through which the film C is drawn out of the spool-case.

The bolt $E^1$ is arranged midway between the sides of the case A and, when the levers E are in their normal positions, it extends upwards to the top of the passage or slot $a$. Thus when a film is wound in the case on the reel B with the fireproof leader-strip D protruding from the outer end of the passage or slot $a$, the bolt $E^1$ will pass through the longitudinal slot $d$ in the leader-strip D. The latter can thus be pulled out from the core or reel B until the inner end of the slot $d$ comes into contact with the bolt $E^1$ which prevents any further withdrawal.

The protruding length of the fireproof leader-strip D can therefore be freely manipulated in any desired manner without possibility that the film C may be withdrawn from the case A. It can be threaded into or through the gate or analogous mechanism of a projector or camera and its free end may be attached by a suitable fastener $d^1$ to the winding reel or preferably to a leader-strip attached to such winding reel.

The film in the case A is then in position ready to be withdrawn and wound upon the winding-reel, but is stopped and prevented by the bolt E'. The operator, in the case of a projector, may in the interval leave the fireproof leader-strip in the path of the light or light-beam for a time that would damage or fire the film itself, but does not damage or fire the fireproof leader-strip.

The spindle F in the projector or camera is formed with a tapered or conical end $f$ over which the spool case A is passed. As the case A is passed over the conical end $f$ of the spindle F the latter engages the upper edges of the levers E gradually depressing them against the action of the springs $e$. The depression of the levers E pulls down the bolt $E^1$ and withdraws it from the longitudinal slot $d$ of the leader-strip D so that the remainder of the leader-strip D followed by the film C can be withdrawn from the spool case A by the operation of the usual operating handle or mechanism of the projector or camera.

The film is withdrawn from the case A until the leader-strip, by which it is attached to the core or bobbin B, is reached.

After all the film C has been withdrawn and exhibited the driving motion of the projector or camera may be reversed, whereupon the film C and its leader-strips are wound or drawn back again into the spool-case A, where the film is finally protected by the leader-strip D after it has been disconnected from the reel or the leader-strip affixed thereto. The spool-case A can then be removed from the spindle F in the projector or camera, whereupon the springs $e$ return the levers E to the normal position and the bolt $E^1$ passes through the slot $d$ in the leader strip D, thus again locking the film in the spool case.

In the form of the invention shown in Fig. 4 the locking bolt $E^1$ is separate from the arms E and is held in the locked position by a flat surface $e^2$ connecting the arms E. Moreover the arms E, instead of being pivoted to the sides of the case A, move in slides $a^2$ formed thereon. The arms E are formed with apertures $e^3$ which, when the arms are held in normal position by the springs $e$, leave uncovered only a small portion of the apertures $a^1$ in the case A. The passing of the spool-case on to conical end $f$ of the spindle F in the projector or camera causes the arms E to be drawn back against the action of the springs $e$ and the surface $e^2$ to be withdrawn from the bolt $E^1$ which consequently falls out of the locking position. A light spring $e^4$ may be employed to assist the downward movement of the bolt $E^1$.

When the case A is removed from the spindle F the springs $e$ pull back the arms E to their normal position and the incline $e^5$ in front of the flat surface $e^2$ returns the bolt $E^1$ to its locked position.

Figure 6:
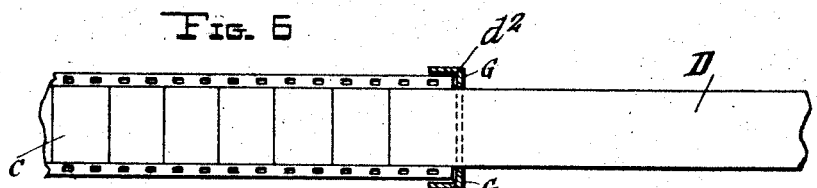
Fig. 6 is a view of the film and leader-strip used therein.

The arms E, instead of actuating a locking bolt, may have their outer ends connected by a plate G provided with an aperture $g$ narrower in width than the width of the film C, as shown in Figs. 5 and 6. The springs $e$ normally hold the arms E in such position as to almost cover the apertures $a^1$ of the case A, at which time the plate G covers the passage $a$ except for the aperture $g$ in such plate. In this case the leader strip D or a portion thereof is narrower than the width of the film C, so that shoulders $d^2$ (see Fig. 6) are formed which engage with the plate G when the latter is in the locked position.

When the spool case A is passed over the conical end of the spindle F in the projector or camera the arms E are depressed and the plate G withdrawn from the passage $a$, thus allowing the film C to be withdrawn from the spool case.

When the film C and leader-strip D have been re-wound into the spool-case A and the latter has been removed from the spindle F, the springs $e$ return the arms to their normal position and the plate G is consequently also returned to its locked position.

Figure 7:
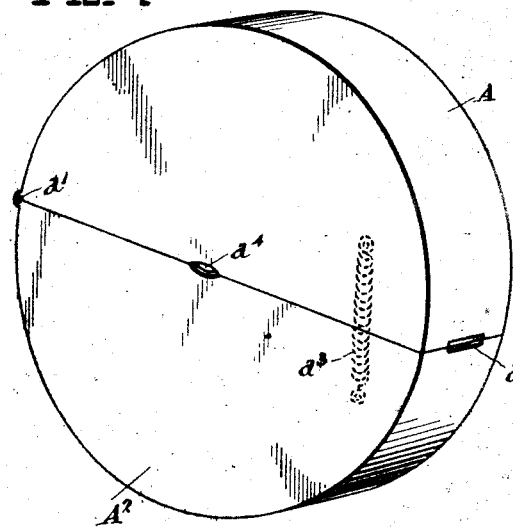
Figs. 7 and 8 are perspective views of a further form of the invention, Fig. 7 showing the spool-case in the locked position and Fig. 8 showing it in the open position after being inserted in the projector or camera.
Figure 8:
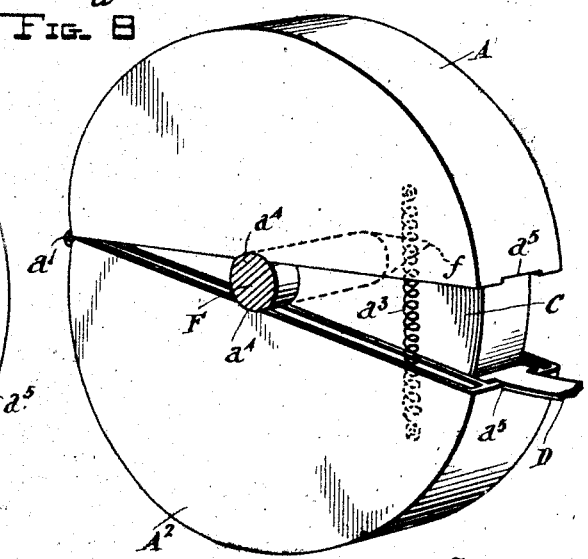

The arms E may be dispensed with, as shown in Figs. 7 and 8, and the spool case may be formed in two halves $A^1$ and $A^2$ hinged together at $a^7$ and normally held closed by the springs $a^3$.

A small flat aperture $a^4$ is formed in each face of the case A to receive the conical end $f$ of the spindle F of the projector or camera, and an aperture $a^5$ is formed in the periphery of the case through which the fireproof leader strip D can protrude. The aperture $a^5$ is narrower than the width of the film C so that the latter cannot be withdrawn when the two halves $A^1$ and $A^2$ are closed together. In this case the leader strip D or a portion thereof is narrower than the width of the film C so that shoulders $d^2$ (see Fig. 6) are formed which engage with the case at the sides of the apertures $a^5$ when the two parts $A^1$ and $A^2$ of the spool case are in the closed position.

When the spool-case is passed over the conical end $f$ of the spindle F in the projector or spool case the two parts $A^1$, $A^2$ are forced apart against the action of the springs $a^3$ and the film C can then be withdrawn from the case.

After the film C and leader-strip D have been rewound into the spool case and the latter removed from the spindle F, the springs $a^3$ return the two parts $A^1$ and $A^2$ into their closed position and the film is again prevented from being withdrawn from the case.

The spool-case is shown in the various figures of the drawings with inner and outer walls, the pivoted arms and springs being arranged in the space between the two walls. If desired, the case may be formed with a single wall and pivoted arms and springs arranged on the inside thereof.

A spool-case formed in accordance with this invention is applicable for use with single-width or double-width film, and for one-way or two-way exhibition, and for lateral shift or inversion between exhibits of first and second row picture series.

What I claim as my invention and desire to protect by Letters Patent is:—

1. A spool case and film carrier for continuous ribbons for use in projectors for the exhibition of pictures or in cameras, comprising a casing to contain a spool of film having a blank leader strip affixed to the free end of the film, said casing having means for locking the blank leader strip against withdrawal from the casing; said casing also having means operable by the insertion of the spoolcase into a projector or camera for releasing said leader strip locking means.

2. A spool-case or film-container according to claim 1, wherein the leader strip locking means comprises a sliding bolt adapted to engage in a longitudinal slot formed in the leader-strip and to lock the leader strip against movement until the bolt is withdrawn.

3. A spool-case or film-container according to claim 1, wherein the leader strip locking means comprises a sliding bolt adapted to engage in a longitudinal slot formed on the leader-strip, and arms pivoted to the casing and carrying the sliding bolt, said arms being depressible to release the bolt when the spool case is placed on the spool-carrying spindle of a projector or camera.

4. A spool-case or film-container according to claim 1, wherein the leader strip locking means comprises a sliding bolt adapted to engage in a longitudinal slot formed in the leader-strip, and the means for releasing such locking means comprises arms which are movable laterally to release the bolt when the spool case is placed on the spool-carrying spindle of a projector or camera.

5. A fireproof, lightproof, and dustproof safety film-container for use in a projector or camera apparatus, comprising: a spool-case with its film-contents locked against withdrawal when not in engagement with the projector or camera apparatus; a protruding tab or end of a fireproof and lightproof leader-strip forming a continuation of the film-strip and provided with means for connecting the protruding leader-strip with the receiving-reel of a projector or camera without opening the spoolcase or withdrawing its film-contents; and means operable by the insertion of the spool case in a projector or camera for automatically unlocking the spoolcase and releasing its film-contents.

In testimony whereof I have hereunto set my hand.

JOHN EDWARD THORNTON.